US009479069B2

(12) United States Patent
Chen

(10) Patent No.: US 9,479,069 B2
(45) Date of Patent: Oct. 25, 2016

(54) FLYBACK-BASED POWER CONVERSION APPARATUS WITH HIGH CONVERSION EFFICIENCY AND LOW COST MECHANISM

(71) Applicant: Power Forest Technology Corporation, Hsinchu (TW)

(72) Inventor: Tso-Min Chen, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 203 days.

(21) Appl. No.: 14/274,780

(22) Filed: May 12, 2014

(65) Prior Publication Data

US 2015/0295496 A1 Oct. 15, 2015

(30) Foreign Application Priority Data

Apr. 11, 2014 (TW) .............................. 103113434 A

(51) Int. Cl.
*H02M 1/32* (2007.01)
*H02M 3/335* (2006.01)

(52) U.S. Cl.
CPC ........... *H02M 3/33523* (2013.01); *H02M 1/32* (2013.01); *H02M 2001/327* (2013.01)

(58) Field of Classification Search
CPC ........... H02M 3/335; H02M 3/33507; H02M 3/33515; H02M 3/33523; H02M 3/33538; H02M 3/33546; H02M 3/33553
See application file for complete search history.

(56) References Cited

U.S. PATENT DOCUMENTS

| 2006/0209581 A1* | 9/2006 | Choi ................. | H02M 3/33523 363/120 |
| 2012/0287682 A1* | 11/2012 | Zhang ............... | H02M 3/33507 363/21.16 |
| 2013/0121044 A1* | 5/2013 | Gao .................. | H02M 3/33523 363/50 |
| 2013/0301302 A1* | 11/2013 | Wu ....................... | H02M 3/325 363/15 |

FOREIGN PATENT DOCUMENTS

| TW | 201101691 | 1/2011 |
| TW | I357702 | 2/2012 |
| TW | 201404017 | 1/2014 |

\* cited by examiner

*Primary Examiner* — Jeffrey Gblende
(74) *Attorney, Agent, or Firm* — Jianq Chyun IP Office

(57) ABSTRACT

A power conversion apparatus including a flyback power conversion circuit, a control chip and a detection auxiliary circuit is provided. The flyback power conversion circuit receives and converts an AC input voltage into a DC output voltage. The control chip generates a PWM signal in response to a power supply requirement to control operations of the flyback power conversion circuit, and the control chip has a multi-function detection pin. The detection auxiliary circuit assists the control chip to obtain an auxiliary voltage related to the DC output voltage via the multi-function detection pin, and thereby determines a transition time of the PWM signal according to the auxiliary voltage. Besides, the detection auxiliary circuit assists the control chip to execute detections of an over temperature protection (OTP) and an over voltage protection (OVP) via the multi-function detection pin respectively within first and second detection phases.

20 Claims, 3 Drawing Sheets

FLYBACK-BASED POWER CONVERSION APPARATUS WITH HIGH CONVERSION EFFICIENCY AND LOW COST MECHANISM

CROSS-REFERENCE TO RELATED APPLICATION

This application claims the priority benefit of Taiwan application serial no. 103113434, filed on Apr. 11, 2014. The entirety of the above-mentioned patent application is hereby incorporated by reference herein and made a part of this specification.

BACKGROUND OF THE INVENTION

1. Field of the Invention

The invention relates to a power conversion technique, and more particularly, to a flyback-based power conversion apparatus.

2. Description of Related Art

The primary purpose of applying a power conversion apparatus is to convert an unstable and high alternating current (AC) input voltage supplied by the power company to a stable and low direct current (DC) output voltage suitable for various electronic devices. Therefore, the power conversion apparatus is widely used in computers, office automatic facilities, industrial control equipments, communication apparatuses and so on.

Pulse width modulation (PWM) control chip is applied in most of the control structures of recent power conversion apparatuses. To protect the power conversion apparatus from being damaged because of over temperature (OT), over voltage (OV) and over current (OC), the pulse width modulation (PWM) control chip usually has a plurality of isolated detection pins for respectively executing the detections of over temperature protection (OTP) and over voltage protection (OVP). In other words, each of the detection pins is only corresponding to one type of function detections. Therefore, applying various function detections by the pulse width modulation (PWM) control chip also means to increase the production cost of manufacturing the pulse width modulation (PWM) control chip.

SUMMARY OF THE INVENTION

The invention is directed to a flyback-based power conversion apparatus for solving the problem as mentioned in Description of Related Art.

A power conversion apparatus of the invention includes a flyback power conversion circuit, a control chip and a detection auxiliary circuit. The flyback power conversion circuit is configured to receive an alternating current (AC) input voltage and convert the AC input voltage in response to a pulse width modulation (PWM) signal, and thereby generates and provides a direct current (DC) output voltage. The control chip is coupled to the flyback power conversion circuit, and generates the PWM signal in response to a power supply requirement to control operations of the flyback power conversion circuit, wherein the control chip has a multi-function detection pin. The detection auxiliary circuit is coupled to the flyback power conversion circuit and the multi-function detection pin of the control chip. The detection auxiliary circuit assists the control chip to obtain an auxiliary voltage related to the DC output voltage via the multi-function detection pin, and thereby determines a transition time of the PWM signal according to the auxiliary voltage. The detection auxiliary circuit assists the control chip to execute a detection of an over temperature protection via the multi-function detection pin within a first detection phase, and assists the control chip to execute a detection of an over voltage protection via the multi-function detection pin within a second detection phase.

In an embodiment of the invention, the control chip enters the first detection phase during an enable period of the PWM signal, and enters the second detection phase during a disable period of the PWM signal.

In an embodiment of the invention, the control chip enters the first detection phase during a disable period of a first period of the PWM signal, and enters the second detection phase during a disable period of a second period of the PWM signal.

In an embodiment of the invention, the control chip includes a control body, an over voltage protection unit, an over temperature protection unit and a valley voltage detection unit. The control body is configured to serve as an operation core of the control chip, and generates the PWM signal in response to the power supply requirement. The over temperature protection unit is coupled to the control body, configured to execute the detection of the over temperature protection within the first detection phase, and thereby provides a first detection result to the control body, wherein the control body determines whether to activate an over temperature protection mechanism in response to the first detection result. The over voltage protection unit is coupled to the control body, configured to execute the detection of the over voltage protection within the second detection phase, and thereby provides a second detection result to the control body, wherein the control body further determines whether to activate an over voltage protection mechanism in response to the second detection result. The valley voltage detection unit is coupled to the control body, configured to extract the auxiliary voltage from the detection auxiliary circuit, and thereby provides a third detection result, wherein the control body further determines whether to enable the PWM signal in response to the third detection result.

In an embodiment of the invention, the valley voltage detection unit extracts the auxiliary voltage related to the DC output voltage from the detection auxiliary circuit, compares the auxiliary voltage with a reference valley voltage, and thereby generates the third detection result. When the auxiliary voltage is greater than or equal to the reference valley voltage, the control body maintains the PWM signal at a disable level in response to the third detection result, and when the auxiliary voltage is less than the reference valley voltage, the control body regulates the PWM signal from the disable level into an enable level in response to the third detection result.

In an embodiment of the invention, when the over temperature protection unit executes the detection of the over temperature protection, the over temperature protection unit provides a detection current for the detection auxiliary circuit to generate a thermosensitive voltage related to an environment temperature in response to the detection current, wherein the over temperature protection compares the thermosensitive voltage with an over temperature protection reference voltage, and thereby generates the first detection result.

In an embodiment of the invention, when the control body determines to activate the over temperature protection mechanism in response to the first detection result, the control body stops outputting the PWM signal until the control body determines to shut down the over temperature protection mechanism in response to the first detection result.

In an embodiment of the invention, when the over voltage protection unit executes the detection of the over voltage protection, the over voltage protection unit extracts the auxiliary voltage related to the DC output voltage from the detection auxiliary circuit, wherein the over voltage protection unit compares the auxiliary voltage with an over voltage protection reference voltage, and thereby generates the second detection result.

In an embodiment of the invention, when the control body determines to activate the over voltage protection mechanism in response to the second detection result, the control body stops outputting the PWM signal until the control body determines to shut down the over voltage protection mechanism in response to the second detection result.

In an embodiment of the invention, the over temperature protection unit includes a detection current source, a first sampling switch, a first comparator and a second sampling switch. The detection current source is configured to generate a detection current. A first terminal of the first sampling switch is coupled to an output terminal of the detection current source. A second terminal of the first sampling switch is coupled to the multi-function detection pin. A control terminal of the first sampling switch receives a first control signal. A positive input terminal of the first comparator receives an over temperature protection reference voltage, and an output terminal of the first comparator is configured to output the first detection result. A first terminal of the second sampling switch is coupled to the second terminal of the first sampling switch and the multi-function detection pin. A second terminal of the second sampling switch is coupled to a negative input terminal of the first comparator. A control terminal of the second sampling switch receives the first control signal.

In an embodiment of the invention, the over voltage protection unit includes a third sampling switch and a second comparator. A first terminal of the third sampling switch is coupled to the multi-function detection pin. A control terminal of the third sampling switch receives a second control signal. A positive input terminal of the second comparator is coupled to a second terminal of the third sampling switch. A negative input terminal of the second comparator receives an over voltage protection reference voltage. An output terminal of the second comparator is configured to output the second detection result.

In an embodiment of the invention, the PWM signal, the first control signal and the second control signal have identical periods, and the first control signal and the second control signal are mutually inverse.

In an embodiment of the invention, the valley voltage detection unit includes a third comparator. The third comparator has a positive input terminal receiving a reference valley voltage, a negative input terminal coupled to the multi-function detection pin, and an output terminal configured to output the third detection result.

In an embodiment of the invention, the over temperature protection unit includes a detection current source, a first sampling switch and a sample-and-hold circuit. The detection current source is configured to generate a detection current. A first terminal of the first sampling switch is coupled to an output terminal of the detection current source. A second terminal of the first sampling switch is coupled to the multi-function detection pin. A control terminal of the first sampling switch receives a first control signal. A positive input terminal of the first comparator receives an over temperature protection reference voltage, and an output terminal of the first comparator is configured to output the first detection result. The sample-and-hold circuit is coupled between the multi-function detection pin and the negative input terminal of the first comparator, wherein the sample-and-hold circuit samples and holds a voltage on the multi-function detection pin according to the first control signal and the second control signal to serve as a comparison basis for the first comparator.

In an embodiment of the invention, the over voltage protection unit includes a second sampling switch and a second comparator. A first terminal of the second sampling switch is coupled to the multi-function detection pin. A control terminal of the second sampling switch receives a second control signal. A positive input terminal of the second comparator is coupled to a second terminal of the second sampling switch. A negative input terminal of the second comparator receives an over voltage protection reference voltage. An output terminal of the second comparator is configured to output the second detection result.

In an embodiment of the invention, periods of the first control signal and the second control signal are twice a period of the PWM signal.

In an embodiment of the invention, the flyback power conversion circuit includes a rectifying circuit, a transformer, a power switch, a first diode and a first capacitor. The rectifying circuit receives the AC input voltage. The transformer includes a primary winding, a secondary winding and an auxiliary winding. A common-polarity terminal of the primary winding is coupled to the rectifying circuit to receive the rectified AC input voltage, and common-polarity terminals of the secondary winding and the auxiliary winding are coupled to a ground terminal. A first terminal of the power switch is coupled to an opposite-polarity terminal of the primary winding. A second terminal of the power switch is coupled to the ground terminal. A control terminal of the power switch is coupled to the control body to receive the PWM signal. An anode of the first diode is coupled to an opposite-polarity terminal of the secondary winding, and a cathode of the first diode outputs the DC output voltage. The first capacitor is coupled between the cathode of the first diode and the ground terminal.

In an embodiment of the invention, the control chip further includes a power pin. The flyback power conversion circuit further includes a first resistor, a second diode and a second capacitor. The first resistor is coupled between an input terminal of the rectifying circuit and the power pin. An anode of the second diode is coupled to an opposite-polarity terminal of the auxiliary winding. A cathode of the second diode is coupled to the power pin. A first terminal of the second capacitor is coupled to the power pin, and a second terminal of the second capacitor is coupled to the ground terminal.

In an embodiment of the invention, the detection auxiliary circuit further includes a third diode, a second resistor, a third resistor and a thermistor. An anode of the third diode is coupled to the opposite-polarity terminal of the auxiliary winding. A first terminal of the second resistor is coupled to a cathode of the third diode. A first terminal of the third resistor is coupled to the second terminal of the second resistor, and the second terminal of the third resistor is coupled to the ground terminal.

Based on above, a power conversion apparatus is provided according to the embodiments of the invention, capable of allowing the control chip to realize various different control and detection functions through the disposition method in which one multi-function detection pin is commonly used. As a result, in addition to the control method for various control and detection functions, the one multi-function detection pin of the control chip may also realize effects of increasing the conversion efficiency of the power conversion apparatus and reducing overall production cost of the control chip.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
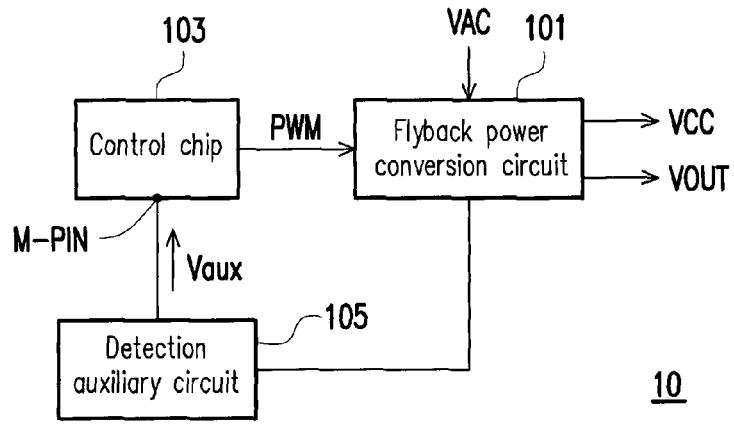
FIG. 1 is a schematic diagram of a power conversion apparatus according to an embodiment of the invention.

In order to make content of the present disclosure more comprehensible, embodiments are described below as the examples to prove that the present disclosure can actually be realized. Moreover, elements/components/steps with same reference numerals represent same or similar parts in the drawings and embodiments.

FIG. 1 is a schematic diagram of a power conversion apparatus according to an embodiment of the invention. Referring to FIG. 1, a power conversion apparatus 10 is of flyback-based. According, the power conversion apparatus 10 includes a flyback power conversion circuit 101, a control chip 103, a detection auxiliary circuit 105.

The flyback power conversion circuit 101 is configured to receive an AC input voltage VAC and convert the AC input voltage VAC in response to a pulse width modulation (PWM) signal PWM from the control chip 103 (i.e., AC-to-DC conversion), and thereby generating and providing a DC output voltage VOUT and a DC system voltage VCC.

The control chip 103 is coupled to the flyback power conversion circuit 101, configured to operate under the DC system voltage VCC generated by the flyback power conversion circuit 101 and generate the PWM signal PWM in response to a power supply requirement of a load (e.g., an electronic device) to control operations of the flyback power conversion circuit 101.

The detection auxiliary circuit 105 is coupled to the flyback power conversion circuit 101 and a multi-function detection pin M-PIN of the control chip 103, and configured to assist the control chip 103 to extract an operation status information (e.g., the DC output voltage VOUT or an operation temperature and so on) related to the flyback power conversion circuit 101. Therein, the detection auxiliary circuit 105 assists the control chip 103 to obtain an auxiliary voltage Vaux related to the DC output voltage VOUT via the multi-function detection pin M-PIN, and thereby determines a transition time of the PWM signal PWM according to the auxiliary voltage Vaux. Besides, the detection auxiliary circuit 103 further assists the control chip to execute a detection of an over temperature protection (OTP) via the multi-function detection pin M-PIN within a first detection phase, and assists the control chip to execute a detection of an over voltage protection (OVP) via the multi-function detection pin M-PIN within a second detection phase.

Figure 2:
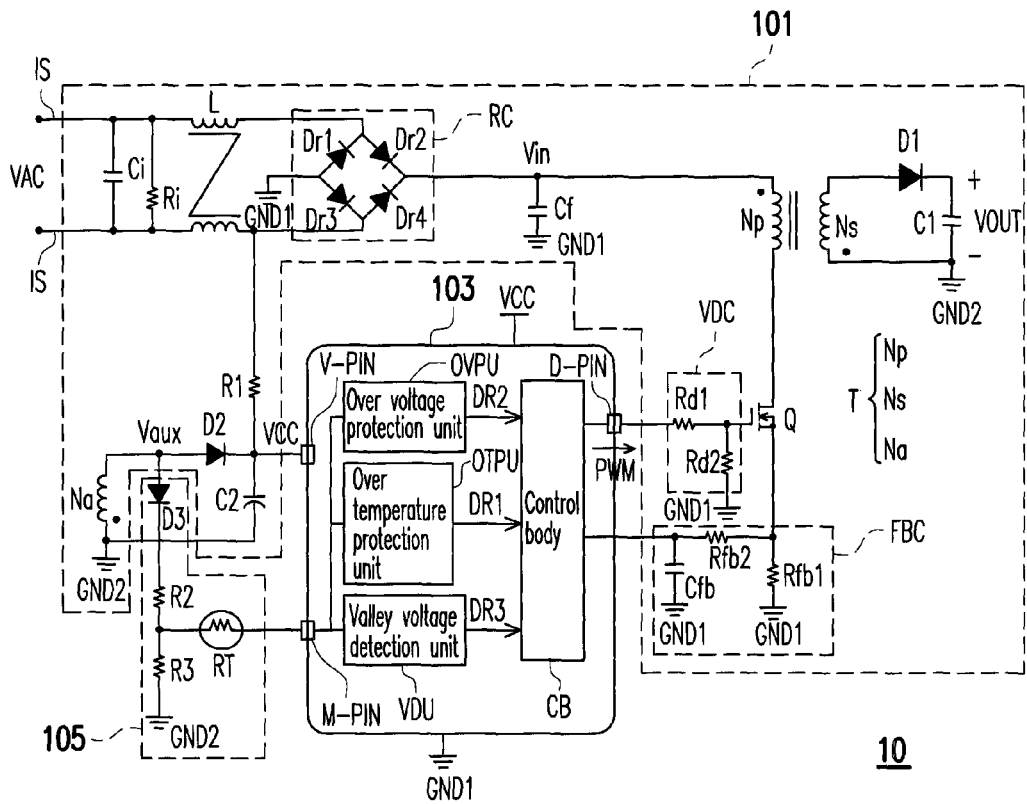
FIG. 2 is a schematic diagram illustrating a circuit scheme of a power conversion apparatus according to an embodiment of the invention.

More specifically, FIG. 2 is a schematic diagram illustrating a circuit scheme of a power conversion apparatus according to an embodiment of the invention. Referring to FIG. 1 and FIG. 2 together, the flyback power conversion circuit 101 includes a rectifying circuit RC, a transformer T, a power switch Q (e.g., a N-type power switch, thus the power switch Q may also be referred to as the N-type power switch Q hereinafter), a voltage division circuit VDC, a feedback circuit FBC, resistors Ri and R1, diodes D1 and D2, and capacitors Ci, Cf, C1 and C2. The control chip 103 at least includes a power pin V-PIN, a drive pin D-PIN and the multi-function detection pin M-PIN, and the control chip 103 includes a control body CB, an over voltage protection unit OVPU, an over temperature protection unit OTPU and a valley voltage detection unit VDU. In addition, the detection auxiliary circuit 105 includes resistors R2 and R3, a diode D3 and a thermistor RT.

In the present embodiment, the rectifying circuit RC receives the AC input voltage VAC from an input side IS of the power conversion apparatus 10, and executes a rectification to the received AC input voltage VAC to generate a rectified voltage Vin. The rectified voltage Vin is provided to the transformer T. The control chip 103 generates the corresponding PWM signal PWM according to the power supply requirement of the load (not illustrated) and the operation information extracted from the detection auxiliary circuit 105 to control an on/off state of the N-type power switch Q, so that the transformer T, the diodes D1 and D2 and the capacitors C1 and C2 may coordinately covert the rectified voltage Vin into the DC output voltage VOUT and the DC system voltage VCC in response to switching of the N-type power switch Q.

More specifically, in the flyback power conversion circuit 101, the capacitor Ci is connected across two terminals of the input side IS to filter/suppress possible noises in the AC input voltage VAC. The resistor Ri and the capacitor Ci are interconnected in parallel, and configured to quickly discharge electrical energy stored by the capacitor Ci when the power conversion apparatus 10 shuts down. A choke winding L includes, for example, two conjugation windings. Said two conjugation windings are coupled to two terminals of the capacitor Ci and the resistor Ri and receive the AC input voltage VAC, wherein the choke winding L may be used to filter noises of power inputted to the rectifying circuit RC.

In the present embodiment, the rectifying circuit RC is, for example, a full-bridge rectifying circuit composed of diodes Dr1 to Dr4 (but not limited thereto). In the rectifying circuit RC, a cathode of the diode Dr1 and an anode of the diode Dr2 are commonly coupled to one of the conjugation windings in the choke winding L, and a cathode of the diode Dr3 and an anode of the diode Dr4 are commonly coupled to another one of the conjugation windings in the choke winding L. The rectifying circuit RC is configured to receive the AC input voltage VAC with the noises being suppressed, and to execute a full wave rectification thereto for generating the rectified voltage Vin. A first terminal of the filter capacitor Cf is coupled to cathodes of the diodes Dr2 and Dr4, and a second terminal of the filter capacitor C1 is coupled to a ground terminal GND1 on primary side. Therein, the filter capacitor Cf is configured to filter the rectified voltage Vin generated by the rectifying circuit RC.

The transformer T includes a primary winding Np, a secondary winding Ns, and an auxiliary winding Na. Therein, a common-polarity terminal (i.e., a dotted terminal) of the primary winding Np of the transformer T is configured to receive the rectified voltage Vin, and common-polarity terminals of the secondary winding Ns and the auxiliary winding Na are coupled to a ground terminal GND2 on secondary side.

On the primary winding Np side, a first terminal (e.g., a drain) of the N-type power switch Q is coupled to an opposite-polarity terminal (i.e., a non-dotted terminal) of the primary winding Np of the transformer T. A control terminal (e.g., a gate) of the N-type power switch Q receives the PWM signal PWM generated by the control chip 103 from the drive pin D-PIN of the control chip 103 via the voltage division circuit VDC (e.g., composed of resistors Rd1 and Rd2 but not limited thereto). A second terminal (e.g., a source) of the N-type power switch Q is coupled to the control chip 130 via the feedback circuit FBC (e.g., composed of resistors Rfb1 and Rfb2 and a capacitor Cfb, but not limited thereto), so as to feed back an output power information to the control chip 103 to serve as a basis for controls.

On the secondary winding Ns side, an anode of the diode D1 is coupled to an opposite-polarity terminal of the secondary winding Ns of the transformer T, and a cathode of the diode D1 is configured to generate the DC output voltage VOUT. A first terminal of the capacitor C1 is coupled to the cathode of the diode D1, and a second terminal of the capacitor C1 is coupled to the ground terminal GND2 on secondary side.

On the auxiliary winding Na side, the resistor R1 is coupled between an input terminal of the rectifying circuit RC and the power pin V-PIN of the control chip 103. An anode of the diode D2 is coupled to an opposite-polarity terminal of the auxiliary winding Na, and a cathode of the diode D2 is coupled to the power pin V-PIN of the control chip 103. A first terminal of the capacitor C2 is coupled to the power pin V-PIN of the control chip 103, and a second terminal of the capacitor C2 is coupled to the ground terminal GND2 on secondary side. Herein, it is worth mentioning that, the ground terminal GND1 on primary side and the ground terminal GND2 on secondary side may be seen as different ground planes for example, but the invention is not limited thereto.

In the detection auxiliary circuit 105, an anode of the diode D3 is coupled to the opposite-polarity terminal of the auxiliary winding Na of the transformer T and the anode of the diode D2. A first terminal of the resistor R2 is coupled to a cathode of the diode D3. A first terminal of the resistor R3 is coupled to a second terminal of the resistor R2, and a second terminal of the resistor R3 is coupled to the ground terminal GND2 on secondary side. A first terminal of the thermistor RT is coupled to the second terminal of the resistor R2 and the first terminal of the resistor R3, and a second terminal of the thermistor is coupled to the multi-function detection pin M-PIN of the control chip 103. In the present embodiment, the thermistor RT may be a thermistor having a negative temperature coefficient (NTC).

More specifically, when the power conversion apparatus 10 operates normally, the control chip 103 may correspondingly generate the PWM signal PWM in response to the power supply requirement of the load (the electronic device) to control operations of the flyback power conversion circuit 101. Under this condition, when the N-type power switch Q is turned on in response to the PWM signal PWM generated by the control chip 103, the AC input voltage VAC is connected across the primary winding Np of the transformer T, such that an inductive current of the primary winding Np of the transformer T may be linearly increased to execute an energy storage. At the same time, on the secondary winding Ns side, there is no current flowing through the secondary winding Ns of the transformer T due to blocking of a reverse bias from the diode D1. In addition, on the auxiliary winding Na side, there is also no current flowing through the auxiliary winding Na of the transformer T due to blocking of a reverse bias from the diode D2.

On the other hand, when the N-type power switch Q is turned off in response to the PWM signal PWM generated by the control chip 103, energy stored in the primary winding Np of the transformer T may be transferred to the secondary winding Ns and the auxiliary winding Na of the transformer T according to the Lenz's law. At the same time, because the diode D1 is turned on by a forward bias, the energy transferred to the secondary winding Ns of the transformer T may charge the capacitor C1 and supply the DC output voltage VOUT to the load (the electronic device). Similarly, the energy transferred to the auxiliary winding Na of the transformer T may supply the DC system voltage VCC to the control chip 103 via the diode D2 and the capacitor C2.

In view of above, it can be known that, based on an operating method in which the PWM signal PWM generated by the control chip 103 alternately turns on and off the N-type power switch Q, the power conversion apparatus 10 is capable of continuously supplying the DC output voltage and the DC system voltage VCC.

In addition, in the control chip 103, the control body CB is configured to serve as an operation core of the control chip 103, and generates the PWM signal PWM in response to the power supply requirement of the load. Input terminals of the over voltage protection unit OVPU, the over temperature protection unit OTPU and the valley voltage detection unit VDU are commonly coupled to the multi-function detection pin M-PIN, and output terminals of the over voltage protection unit OVPU, the over temperature protection unit OTPU and the valley voltage detection unit VDU are respectively coupled to the control body CB. Therein, the over voltage protection unit OVPU and the over temperature protection unit OTPU execute detections of an over temperature protection and an over voltage protection respectively within different phases, and thereby respectively provide the detection results DR1 and DR2 to the control body CB. Accordingly, the control body CB may then determine whether to activate an over voltage protection mechanism and/or an over temperature protection mechanism respectively according to the detection results DR1 and DR2.

More specifically, when the over temperature protection unit OTPU executes the detection of the over temperature protection within the first detection phase, the over temperature protection unit OTPU may provide a detection current which flows through the thermistor RT to the detection auxiliary circuit 105 via the multi-function detection pin M-PIN. With a characteristic of a correlation between a resistance of the thermistor RT and an environment temperature, the detection auxiliary circuit 105 may generate a thermosensitive voltage related to temperature on the multi-function detection pin M-PIN, so that the over temperature protection unit OTPU may generate the detection result DR1 which instructs to activate or shut down the over temperature protection mechanism by comparing the extracted thermosensitive voltage with a preset reference voltage.

Similarly, when the over voltage protection unit OVPU executes the detection of the over voltage protection mechanism within the second detection phase, the over voltage protection unit OVPU may extract the auxiliary voltage Vaux related to the DC output voltage VOUT from the detection auxiliary circuit 105 via the multi-function detection pin M-PIN, and generate the detection result DR2 which instructs to activate or shut down the over voltage protection mechanism by comparing the extracted auxiliary voltage Vaux with a preset reference voltage.

Therein, the first detection phase and the second detection phase may be designed to alternately switch in accordance with a signal timing of the PWM signal PWM. For instance, the control chip 103 may enter the first detection phase during an enable period (a period when the signal is maintained at an enable level (e.g., logic "1")) of the PWM signal PWM to execute the detection of the over temperature protection, and enter the second detection phase during a disable period (a period when the signal is maintained at a disable level (e.g., logic "0")) of the PWM signal PWM to execute the detection of the over voltage protection. Alternatively, the control chip 103 may alternately enter the first detection phase and the second detection phase during the disable period of different periods of the PWM signal PWM. Different power timings of the foregoing embodiments will be further described in the following embodiments.

On the other hand, the valley voltage detection unit VDU may continuously extract the auxiliary voltage Vaux from the detection auxiliary circuit 105 via the multi-function detection pin M-PIN, generate a corresponding detection result DR3 according to the extracted auxiliary voltage Vaux, and provide the detection result DR3 to the control body CB. Therefore, the control body CB may then determine whether to enable the PWM signal PWM in response to the received detection result DR3, thereby turning on or off the power switch Q.

When the control body CB determines not to activate the over temperature protection mechanism and/or the over voltage protection mechanism in response to the detection results DR1 and DR2, the control body CB may generate the PWM signal PWM according to the power supply requirement of the load, and determine the transition time of the PWM signal PWM according to the detection result DR3. Otherwise, when the control body CB determines to activate the over temperature protection mechanism in response to the detection result DR1 or activate the over voltage protection mechanism in response to the detection result DR2, the control body CB may stop outputting the PWM signal PWM until the control body CB determines to shut down the over temperature protection mechanism in response to the detection result DR1 (i.e, the over temperature is resolved), or until the control body CB determines to shut down the over voltage protection mechanism in response to the detection result DR2 (i.e, the over voltage is resolved).

In other words, in the present embodiment, the over voltage protection unit OVPU, the over temperature protection unit OTPU and the valley voltage detection unit VDU may all adopt a disposition method in which the same multi-function detection pin M-PIN are commonly used, so that the control chip 103 is capable of realizing different control and detection functions at the time to reduce design and manufacturing costs for the control chip 103 and the power conversion apparatus 10.

To explain application scheme and power timing of the power conversion apparatus 10 according to the embodiments of the invention more clearly, embodiment of FIG. 3 to FIG. 6 are provided below for further description.

Figure 3:
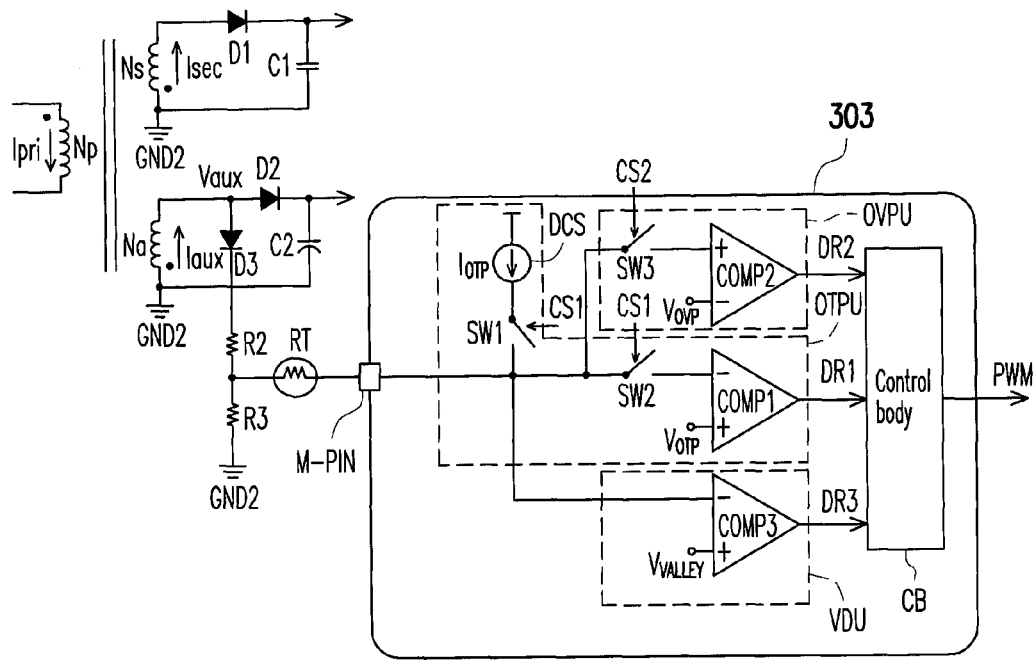
FIG. 3 is a schematic diagram illustrating a circuit scheme of a control chip according to an embodiment of the invention.

FIG. 3 is a schematic diagram illustrating a circuit scheme of a control chip according to an embodiment of the invention. Referring to FIG. 3, in a control chip 303, the over temperature protection unit OTPU includes a detection current source DCS, sampling switches SW1 and SW2, and a comparator COMP1. The over voltage protection unit OVPU includes a sampling switch SW3 and a comparator COMP2. The valley voltage detection unit VDU includes a comparator COMP3.

In the over temperature protection unit OTPU, the detection current source DCS is configured to generate a detection current $I_{OTP}$. A first terminal of the sampling switch SW1 is coupled to an output terminal of the detection current source DCS, a second terminal of the sampling switch SW1 is coupled to the multi-function detection pin M-PIN, and a control terminal of the sampling switch receives a control signal CS1 (which is sent by the control body CB but not limited thereto), so that an on/off state of the sampling switch SW1 may be determined according to the control signal CS1. A first terminal of the sampling switch SW2 is coupled to the second terminal of the sampling switch SW1 and the multi-function detection pin M-PIN, a second terminal of the sampling switch SW2 is coupled to a negative input terminal of the comparator COMP1, and a control terminal of the sampling switch SW2 also receives the control signal CS1, so that an on/off state thereof may be determined according to the control signal CS1. A positive input terminal of the comparator COMP1 receives a preset over temperature protection reference voltage $V_{OTP}$ (which may be set by designers), and an output terminal of the comparator COMP1 is configured to output the detection result DR1.

In the over voltage protection unit OVPU, a first terminal of the sampling switch SW3 is coupled to the multi-function detection pin M-PIN, and a control terminal of the sampling switch SW3 receives a control signal CS2 (which is sent by the control body CB but not limited thereto), so that an on/off state thereof may be determined according to the control signal CS2. A positive input terminal of the comparator COMP2 is coupled to a second terminal of the sampling switch SW3, a negative input terminal of the comparator COMP2 receives an over voltage protection reference voltage $V_{OVP}$, and an output terminal COMP2 is configured to output the detection result DR2.

In the valley voltage detection unit VDU, a positive input terminal of the comparator COMP3 receives a reference valley voltage $V_{VALLEY}$, a negative input terminal of the comparator COMP3 is coupled to the multi-function detection pin M-PIN, and an output terminal of the comparator COMP3 is configured to output the detection result DR3. Therein, by operating the valley voltage detection unit VDU, the control chip 303 only enables the PWM signal PWM to turn on the power switch Q when the auxiliary voltage Vaux is lower than the preset reference valley voltage $V_{VALLEY}$, so that the primary winding Np may execute the energy storage. That is, the transition time/frequency of the PWM signal PWM/the N-type power switch Q may be dynamically determined according to a comparison result of the auxiliary voltage Vaux and the reference valley voltage $V_{VALLEY}$. Accordingly, as compared to a traditional driving method that drives the power switch Q by the PWM signal PWM with fixed frequency, the scheme of the present embodiment is capable of effectively reducing a switching loss of the N-type power switch Q, so as to increase an overall conversion efficiency of the power conversion apparatus.

Figure 4:
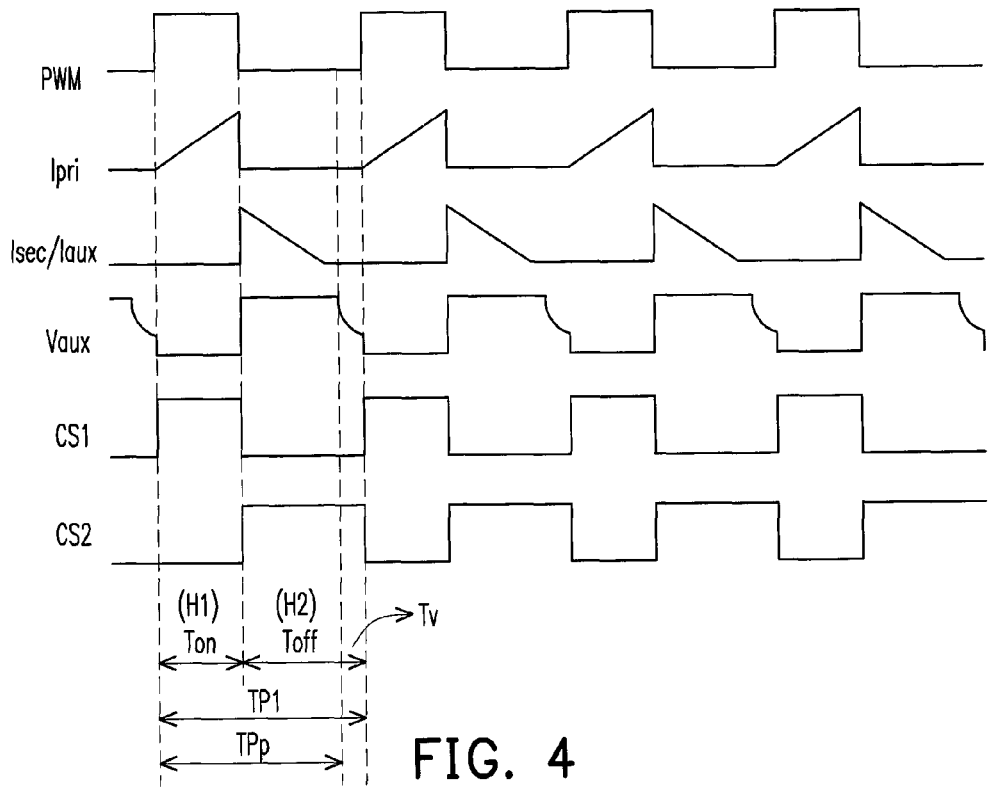
FIG. 4 is schematic diagram illustrating a power timing of the power conversion apparatus according to the embodiment of FIG. 3.

FIG. 4 is schematic diagram illustrating a power timing of the power conversion apparatus according to the embodiment of FIG. 3. Referring to FIG. 3 and FIG. 4, in the present embodiment, the control signals CS1 and CS2 each has a period substantially identical to that of the PWM signal PWM. Therein, a timing of the control signal CS1 is synchronous with the PWM signal PWM, a timing of the control signal CS2 has a phase being different by 180 degrees with respect to the control signal CS1/the PWM signal PWM (i.e., the control signal CS1 and the control signal CS2 are mutually inverse).

In view of the power timing in a period TP1, first, the control chip 303 enters a first detection phase H1 during an enable period Ton of the PWM signal PWM. At the first detection phase H1, the control signal CS1 is at the enable level (logic "1") and the control signal CS2 is at the disable level (logic "0"). On the other hand, the N-type power switch Q is turned on in response to the enabled PWM signal PWM, so that an induced current Ipri on the primary winding Np is gradually increased, whereas the secondary winding Ns and the auxiliary winding Na do not generate induced currents Isec and Iaux due to restrictions by the diodes D2 and D3, respectively.

In this case, the sampling switches SW1 and SW2 are turned on in response to the control signal CS1, and the sampling switch SW3 is turned off in response to control signal CS2. In this circuit configuration, the detection current $I_{OTP}$ generated by the detection current source DCS flows through the thermistor RT and the resistor R3 via the multi-function detection pin M-PIN to the ground terminal GND2 on secondary side. Based on the correlation between the resistance of the thermistor RT and the environment temperature, the detection current $I_{OTP}$ that flows through the thermistor RT and the resistor R3 may generate the thermosensitive voltage related to temperature on the multi-function detection pin M-PIN. The thermosensitive voltage is provided to the negative input terminal of the comparator COMP1.

Accordingly, the over temperature protection unit OTPU may execute the detection of the over temperature protection based on the extracted thermosensitive voltage. More specifically, the comparator COMP1 compares the thermosensitive voltage on the multi-function detection pin M-PIN with the over temperature protection reference voltage $V_{OTP}$. Therein, if the thermosensitive voltage is lower than the over temperature protection reference voltage $V_{OTP}$, the comparator COMP1 generates the detection result DR1 being logic "1" to indicate that the over temperature has occurred on the power conversion apparatus. Otherwise, if the thermosensitive voltage is higher than the over temperature protection reference voltage $V_{OTP}$, the comparator COMP1 generates the detection result DR1 being logic "0" to indicate that the over temperature has not occurred on the power conversion apparatus.

After the enable period Ton of the PWM signal PWM is ended, the PWM signal PWM successively enters a disable period Toff. During the disable period Toff of the PWM signal PWM, the control chip 303 switches from the first detection phase H1 into a second detection phase H2. At the second detection phase H2, the control signal CS1 is switched into the disable level and the control signal CS2 is switched into the enable level. On the other hand, the N-typw power switch Q is turned off in response to the disabled PWM signal PWM, such the induced currents Isec and Iaux may be correspondingly generated on the secondary winding Ns and the auxiliary winding Na.

In this case, the sampling switches SW1 and SW2 are turned off in response to the control signal CS1, and the sampling switch SW3 is turned on in response to control signal CS2. In this circuit configuration, a conduction path connecting the diode D3, the resistors R2 and R3 to the ground terminal GND2 is established, so that the auxiliary voltage Vaux (related to the DC output voltage VOUT) on the opposite-polarity terminal of the auxiliary winding Na may be provided to the positive input terminal of the comparator COMP2.

Accordingly, the over voltage protection OVPU may execute the detection of the over voltage protection based on the extracted auxiliary voltage Vaux. More specifically, if the auxiliary voltage Vaux is higher than the over voltage protection reference voltage $V_{OVP}$, the comparator COMP2 generates the detection result DR2 being logic "1" to indicate that the over voltage has occurred on the power conversion apparatus. Otherwise, if the auxiliary voltage Vaux is lower than the over voltage protection reference voltage $V_{OVP}$, the comparator COMP2 generates the detection result DR2 being logic "0" to indicate that the over voltage has not occurred on the power conversion apparatus.

As the induced current Iaux of the auxiliary winding Na is reduced to approach 0, the auxiliary voltage Vaux is also gradually lowered. During a period Tv in which the auxiliary voltage Vaux is gradually lowered, the valley voltage detection unit VDU may detect whether the auxiliary voltage Vaux is lower than the reference valley voltage $V_{VALLEY}$, so as to determine the transition time of the PWM signal PWM.

More specifically, if a voltage detected by the valley voltage detection unit VDU is higher than the reference valley voltage $V_{VALLEY}$, the comparator COMP3 generates the detection result DR3 being logic "0". In this case, the control body CB maintains the PWM signal PWM at the disable level in response to the detection result DR3 being logic "0" instead of instantly enabling the PWM signal PWM right after a preset period TPp (which may be decided according to the power supply requirement of the load but not limited there to) is ended. On the other hand, if the auxiliary voltage Vaux detected by the valley voltage detection unit VDU is lower than the reference valley voltage $V_{VALLEY}$, the comparator COMP3 generates the detection result DR3 being logic "1". In this case, the control body CB may regulate the PWM signal PWM from the disable level into the enable level in response to the detection result DR3 being logic "1". In other words, in the present embodiment, lengths of the periods in the PWM signal PWM may be different from one another (but all of them are at least greater than the preset period TPp) under control of the valley voltage detection unit VDU.

Therein, the control chip 303 repeatedly executes aforesaid method in each period of the PWM signal PWM, thus related description is not repeated hereinafter.

Figure 5:
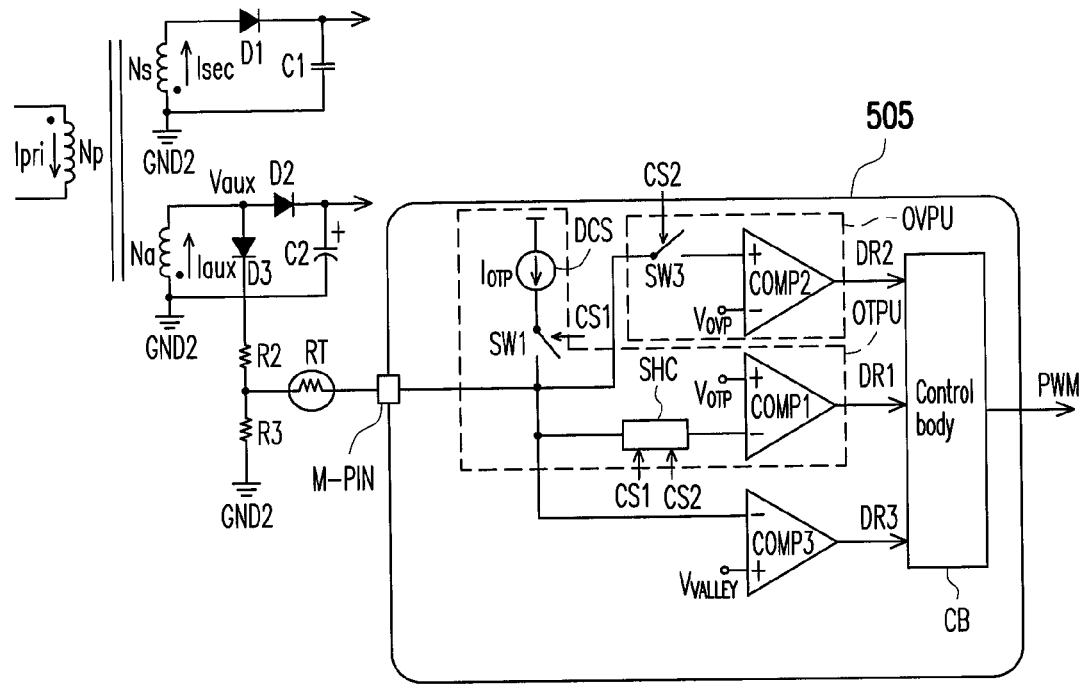
FIG. 5 is a schematic diagram illustrating a circuit scheme of a control chip according to another embodiment of the invention.

FIG. 5 is a schematic diagram illustrating a circuit scheme of a control chip according to another embodiment of the invention. Referring to FIG. 5, in a control chip 505, the over temperature protection unit OTPU includes a detection current source DCS, a sampling switch SW1, a comparator COMP1 and a sample-and-hold circuit SHC. The over voltage protection unit OVPU includes a sampling switch SW3 and a comparator COMP2. The valley voltage detection unit VDU includes a comparator COMP3.

In the present embodiment, scheme and configuration of the over voltage protection unit OVPU and the valley voltage detection unit VDC are substantially identical to those in the embodiment of FIG. 3, which will not be repeated hereinafter. A major difference between the present embodiment and the embodiment of FIG. 3 is configuration and power timing of the over temperature protection unit OTPU.

In the over temperature protection unit OTPU of the present embodiment, the detection current source DCS is configured to generate a detection current $I_{OTP}$. A first terminal of the sampling switch SW1 is coupled to an output terminal of the detection current source DCS, a second terminal of the sampling switch SW1 is coupled to the multi-function detection pin M-PIN, and a control terminal of the sampling switch receives a control signal CS1, so that an on/off state of the sampling switch SW1 may be determined according to the control signal CS1. A positive input terminal of the comparator COMP1 receives a preset over temperature protection reference voltage $V_{OTP}$, and an output terminal of the comparator COMP1 is configured to output the detection result DR1. The sample-and-hold circuit SHC is coupled between the multi-function detection pin M-PIN and the negative input terminal of the comparator COMP1, wherein the sample-and-hold circuit SHC samples and holds a voltage on the multi-function detection pin M-PIN according to the control signals CS1 and CS2 to serve as a comparison basis for the comparator COMP1.

Figure 6:
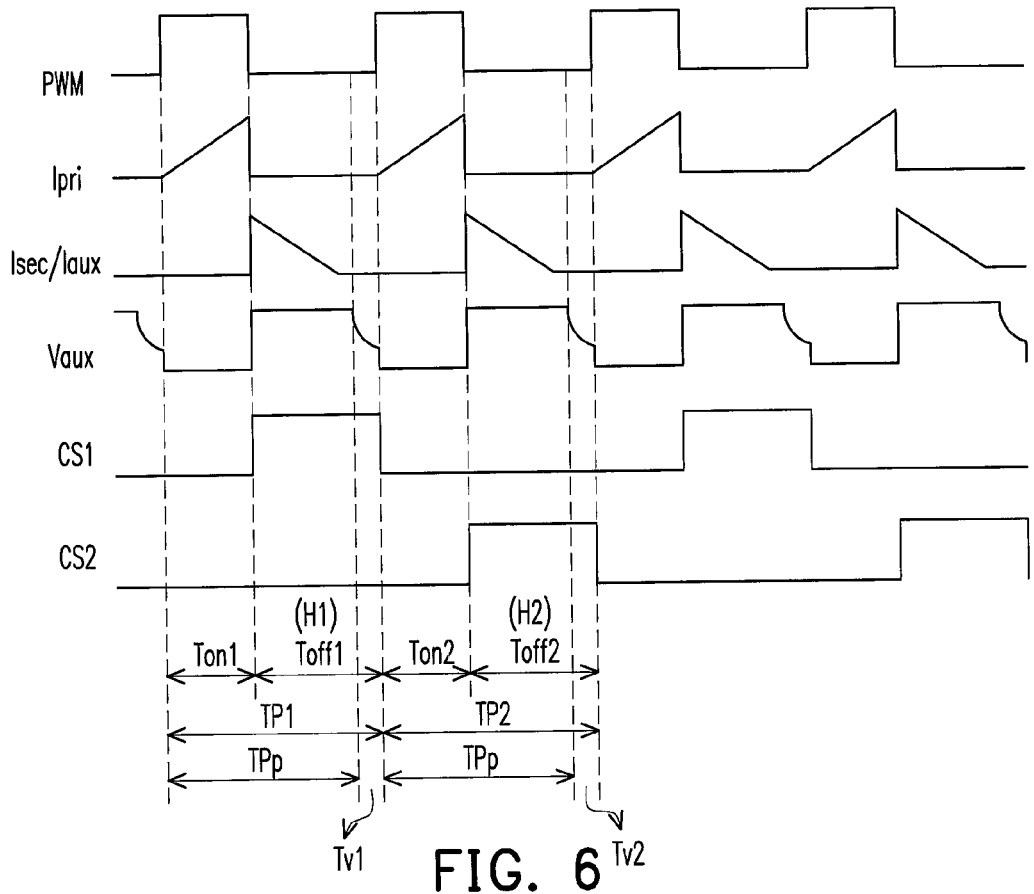
FIG. 6 is schematic diagram illustrating a power timing of the power conversion apparatus according to the embodiment of FIG. 5.

FIG. 6 is schematic diagram illustrating a power timing of the power conversion apparatus according to the embodiment of FIG. 5. Referring to FIG. 5 and FIG. 6, in the present embodiment, periods of the control signals CS1 and CS2 are substantially twice a period of the PWM signal PWM, respectively. Therein, the control signal CS1 is enabled during the disable period of an odd period of the PWM signal PWM, and the control signal CS2 is enabled during the disable period of an even period of the PWM signal PWM.

It should be noted that, the odd period and the even period are illustrated by reference to a period sequence (which counted from the left) of drawing for example, but the invention is not limited thereto. More specifically, it falls within the scope of the present embodiment as long as the control signals CS1 and CS2 may be alternately disabled/enabled during the disable period of two consecutive periods of the PWM signal PWM, respectively.

In view of the power timing within periods TP1 and TP2, first, the control signals CS1 and CS2 are both at the disable level during the period TP1 of an enable period Ton1 of the PWM signal PWM. On the other hand, the N-type power switch Q is turned on in response to the enabled PWM signal PWM, so that an induced current Ipri on the primary winding Np is gradually increased, whereas the secondary winding Ns and the auxiliary winding Na do not generate induced currents Isec and Iaux due to restrictions by the diodes D2 and D3, respectively.

In this case, the sampling switch SW1 is turned off in response to the control signal CS1, and the sampling switch SW3 is turned off in response to control signal CS2. In this circuit configuration, no detections are executed by either one of the over temperature protection unit OTPU and the over voltage protection unit OVPU.

After the enable period Ton1 of the period TP1 of the PWM signal PWM is ended, the PWM signal PWM successively enters a disable period Toff1. During the disable period Toff1 of the PWM signal PWM, the control chip 505 enters the first detection phase H1. At the first detection phase H1, the control signal CS1 is switched from the disable level into the enable level, and the control signal CS2 is maintained at the disable level.

In this case, the sampling switches SW1 is turned on in response to the control signal CS1, and the sample-and-hold circuit SHC samples and holds the voltage on the multi-function detection pin M-PIN in response to the control signal CS1. In other words, a current circuit configuration is similar to the circuit configuration of the embodiment of FIG. 3 within the first detection phase, thus the over temperature protection unit OTPU may execute the detection of over temperature protection by using an operating method similar to that of the foregoing embodiment.

Next, as the induced current Iaux of the auxiliary winding Na is reduced to approach 0, the auxiliary voltage Vaux is also gradually lowered. During a period Tv1 in which the auxiliary voltage Vaux is gradually lowered, the valley voltage detection unit VDU may detect whether the auxiliary voltage Vaux is lower than the reference valley voltage $V_{VALLEY}$, so as to determine the transition time of the PWM signal PWM. Therein, the control body CB enables the PWM signal PWM when the auxiliary voltage Vaux is lower than the reference valley voltage $V_{VALLEY}$, and then enters the next period TP2.

During an enable period Ton2 of the period TP2, the control signal CS1 is switched back to the disable level again, and the control signal CS2 is still maintained at the disable level. Therefore, circuit operations of the control chip 505 during the enable period Ton2 are identical to the circuit operations in afore-said enable period Ton1.

Next, after the enable period Ton2 of the period TP2 of the PWM signal PWM is ended, the PWM signal PWM successively enters a disable period Toff2. During the disable period Toff2 of the PWM signal PWM, the control chip 505 enters the second detection phase H2. At the second detection phase H2, the control signal CS1 is maintained at the disable level, and the control signal CS2 is switched from the disable level into the enable level.

In this case, the sampling switches SW1 is turned off in response to the control signal CS1, and the sample-and-hold circuit SHC stops to sample and hold the voltage on the multi-function detection pin M-PIN in response to the control signal CS2. In other words, a current circuit configuration is similar to the circuit configuration of the embodiment of FIG. 3 within the second detection phase, thus the over voltage protection unit OVPU may execute the detection of the over voltage protection by using an operating method similar to that of the foregoing embodiment.

Next, similar to that of the period Tv1 within the period TP1, as the induced current Iaux of the auxiliary winding Na is reduced to approach 0, the auxiliary voltage Vaux is also gradually lowered within the period Tv2. Therein, operations of the control chip 505 in the period Tv2 of the period TP2 are similar to the operations in the period Tv1 of the previous period TP1. In addition, the control chip 505 may repeatedly execute afore-said operations by using the two periods TP1 and TP2 of the PWM signal PWM as 1 unit, thus related description is not repeated hereinafter.

In summary, a power conversion apparatus is provided according to the embodiments of the invention, capable of allowing the control chip to realize various different control and detection functions through the disposition method in which one multi-function detection pin is commonly used. Therein, by switching the sampling switches disposed inside the control chip during different operation periods, the voltage on the same multi-function detection pin may be used as the basis for the detections of the over temperature protection and the over voltage protection. Moreover, by extracting the voltage on the multi-function detection pin, the control method based on magnitude of the DC output voltage may also be realized to dynamically changing the transition time of the PWM signal. As a result, in addition to the control method for various control and detection functions, the one multi-function detection pin of the control chip may also realize effects of increasing the conversion efficiency of the power conversion apparatus and reducing overall production cost of the control chip.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power conversion apparatus, comprising:
   a flyback power conversion circuit, configured to receive an alternating current (AC) input voltage and convert the AC input voltage in response to a pulse width modulation (PWM) signal, and thereby generating and providing a direct current (DC) output voltage;
   a control chip, coupled to the flyback power conversion circuit, and generating the PWM signal in response to a power supply requirement to control operations of the flyback power conversion circuit, wherein the control chip has one multi-function detection pin; and
   a detection auxiliary circuit, coupled to the flyback power conversion circuit and the multi-function detection pin of the control chip,
   wherein the detection auxiliary circuit assists the control chip to obtain an auxiliary voltage related to the DC output voltage via the multi-function detection pin, and thereby determines a transition time of the PWM signal according to a comparison result of the auxiliary voltage and a reference valley voltage,
   wherein the detection auxiliary circuit assists the control chip to execute a detection of an over temperature protection via the multi-function detection pin within a first detection phase, and assists the control chip to execute a detection of an over voltage protection via the multi-function detection pin within a second detection phase.

2. The power conversion apparatus of claim 1, wherein the control chip enters the first detection phase during an enable period of the PWM signal, and enters the second detection phase during a disable period of the PWM signal.

3. The power conversion apparatus of claim 1, wherein the control chip enters the first detection phase during a disable period of a first period of the PWM signal, and enters the second detection phase during a disable period of a second period of the PWM signal.

4. The power conversion apparatus of claim 1, wherein the control chip comprises:
   a control body, configured to serve as an operation core of the control chip, and generate the PWM signal in response to the power supply requirement;
   an over temperature protection unit, coupled to the control body, configured to execute the detection of the over temperature protection within the first detection phase, and thereby provide a first detection result to the control body, wherein the control body determines whether to activate an over temperature protection mechanism in response to the first detection result;
   an over voltage protection unit, coupled to the control body, configured to execute the detection of the over voltage protection within the second detection phase, and thereby provide a second detection result to the control body, wherein the control body further determines whether to activate an over voltage protection mechanism in response to the second detection result; and
   a valley voltage detection unit, coupled to the control body, configured to extract the auxiliary voltage from the detection auxiliary circuit, and thereby provide a third detection result, wherein the control body further determines whether to enable the PWM signal in response to the third detection result.

5. The power conversion apparatus of claim 4, wherein the valley voltage detection unit extracts the auxiliary voltage related to the DC output voltage from the detection auxiliary circuit, compares the auxiliary voltage with the reference valley voltage, and thereby generates the third detection result,
   wherein when the auxiliary voltage is greater than or equal to the reference valley voltage, the control body maintains the PWM signal at a disable level in response to the third detection result, and
   wherein when the auxiliary voltage is less than the reference valley voltage, the control body regulates the PWM signal from the disable level into an enable level in response to the third detection result.

6. The power conversion apparatus of claim 4, wherein when the over temperature protection unit executes the detection of the over temperature protection, the over temperature protection unit provides a detection current for the detection auxiliary circuit to generate a thermosensitive voltage related to an environment temperature in response to the detection current, wherein the over temperature protection compares the thermosensitive voltage with an over temperature protection reference voltage, and thereby generates the first detection result.

7. The power conversion apparatus of claim 6, wherein when the control body determines to activate the over temperature protection mechanism in response to the first detection result, the control body stops outputting the PWM signal until the control body determines to shut down the over temperature protection mechanism in response to the first detection result.

8. The power conversion apparatus of claim 4, wherein when the over voltage protection unit executes the detection of the over voltage protection, the over voltage protection unit extracts the auxiliary voltage related to the DC output voltage from the detection auxiliary circuit, wherein the over voltage protection unit compares the auxiliary voltage with an over voltage protection reference voltage, and thereby generates the second detection result.

9. The power conversion apparatus of claim 8, wherein when the control body determines to activate the over voltage protection mechanism in response to the second detection result, the control body stops outputting the PWM signal until the control body determines to shut down the over voltage protection mechanism in response to the second detection result.

10. The power conversion apparatus of claim 4, wherein the over temperature protection unit comprises:
   a detection current source, configured to generate a detection current;
   a first sampling switch, having a first terminal coupled to an output terminal of the detection current source, a second terminal coupled to the multi-function detection pin, and a control terminal receiving a first control signal;

a first comparator, having a positive input terminal receiving an over temperature protection reference voltage, and an output terminal configured to output the first detection result; and a second sampling switch, having a first terminal coupled to the second terminal of the first sampling switch and the multi-function detection pin, a second terminal coupled to a negative input terminal of the first comparator, and a control terminal receiving the first control signal.

11. The power conversion apparatus of claim 10, wherein the over voltage protection unit comprises:

a third sampling switch, having a first terminal coupled to the multi-function detection pin, and a control terminal receiving a second control signal; and a second comparator, having a positive input terminal coupled to a second terminal of the third sampling switch, a negative input terminal receiving an over voltage protection reference voltage, and an output terminal configured to output the second detection result.

12. The power conversion apparatus of claim 11, wherein the PWM signal, the first control signal and the second control signal have identical periods, and the first control signal and the second control signal are mutually inverse.

13. The power conversion apparatus of claim 11, wherein the valley voltage detection unit comprises:

a third comparator, having a positive input terminal receiving the reference valley voltage, a negative input terminal coupled to the multi-function detection pin, and an output terminal configured to output the third detection result.

14. The power conversion apparatus of claim 4, wherein the over temperature protection unit comprises:

a detection current source, configured to generate a detection current;

a first sampling switch, having a first terminal coupled to an output terminal of the detection current source, a second terminal coupled to the multi-function detection pin, and a control terminal receiving a first control signal;

a first comparator, having a positive input terminal receiving an over temperature protection reference voltage, and an output terminal configured to output the first detection result; and a sample-and-hold circuit, coupled between the multi-function detection pin and the negative input terminal of the first comparator, wherein the sample-and-hold circuit samples and holds a voltage on the multi-function detection pin according to the first control signal and the second control signal to serve as a comparison basis for the first comparator.

15. The power conversion apparatus of claim 14, wherein the over voltage protection unit comprises:

a second sampling switch, having a first terminal coupled to the multi-function detection pin, and a control terminal receiving the second control signal; and a second comparator, having a positive input terminal coupled to a second terminal of the second sampling switch, a negative input terminal receiving an over voltage protection reference voltage, and an output terminal configured to output the second detection result.

16. The power conversion apparatus of claim 15, wherein periods of the first control signal and the second control signal are twice a period of the PWM signal.

17. The power conversion apparatus of claim 15, wherein the valley voltage detection unit comprises:

a third comparator, having a positive input terminal receiving the reference valley voltage, a negative input terminal coupled to the multi-function detection pin, and an output terminal configured to output the third detection result.

18. The power conversion apparatus of claim 4, wherein the flyback power conversion circuit comprises:

a rectifying circuit, receiving the AC input voltage;

a transformer, having a primary winding, a secondary winding and an auxiliary winding, wherein a common-polarity terminal of the primary winding is coupled to the rectifying circuit to receive the rectified AC input voltage, and common-polarity terminals of the secondary winding and the auxiliary winding are coupled to a ground terminal;

a power switch, having a first terminal coupled to an opposite-polarity terminal of the primary winding, a second terminal coupled to the ground terminal, and a control terminal coupled to the control body to receive the PWM signal;

a first diode, having an anode coupled to an opposite-polarity terminal of the secondary winding, and a cathode outputting the DC output voltage; and a first capacitor, coupled between the cathode of the first diode and the ground terminal.

19. The power conversion apparatus of claim 18, wherein the control chip further comprises a power pin, and the flyback power conversion circuit further comprises:

a first resistor, coupled between an input terminal of the rectifying circuit and the power pin;

a second diode, having an anode coupled to an opposite-polarity terminal of the auxiliary winding, and a cathode coupled to the power pin; and a second capacitor, having a first terminal coupled to the power pin, and a second terminal coupled to the ground terminal.

20. The power conversion apparatus of claim 19, wherein the detection auxiliary circuit comprises:

a third diode, having an anode coupled to the opposite-polarity terminal of the auxiliary winding;

a second resistor, having a first terminal coupled to a cathode of the third diode;

a third resistor, having a first terminal coupled to a second terminal of the second resistor, and a second terminal coupled to the ground terminal; and a thermistor, having a first terminal coupled to the second terminal of the second resistor and the first terminal of the third resistor, and a second terminal coupled to the multi-function detection pin.

* * * * *